Dec. 8, 1953            J. A. KOLBE            2,661,968
ATTACHMENT OF DECORATIVE BALLS BETWEEN
PARALLEL TUBE ELEMENTS OF FURNITURE
Filed Aug. 10, 1949
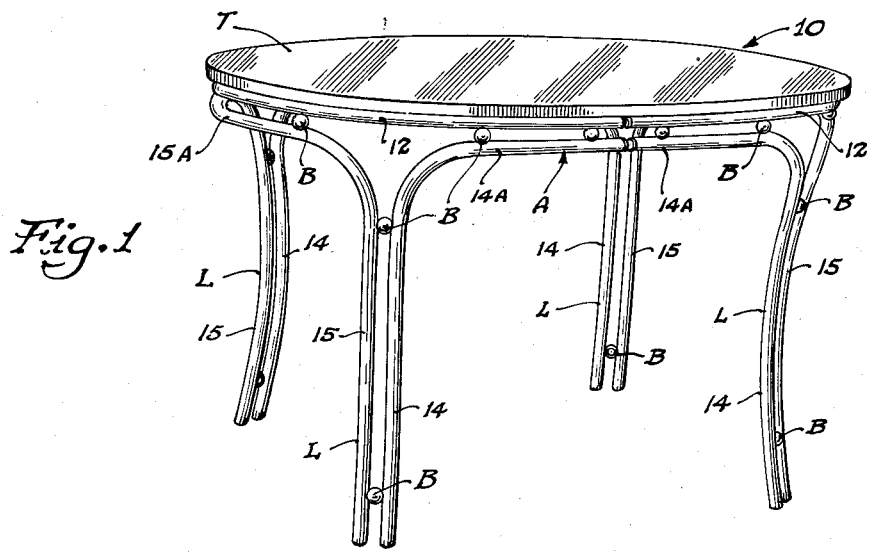
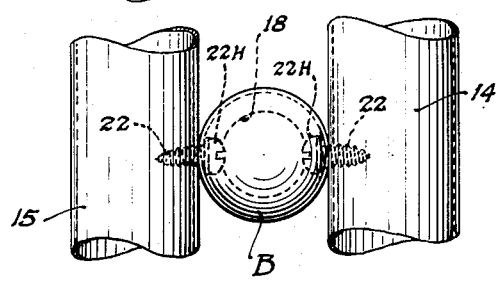
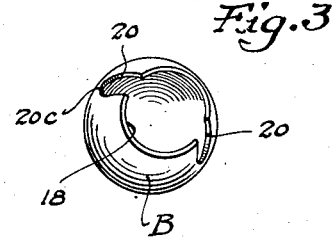
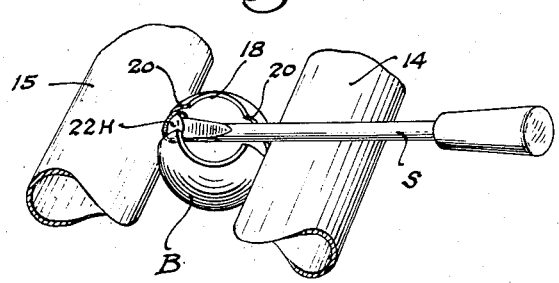
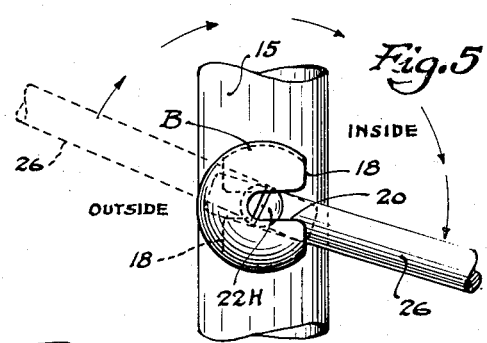
Inventor
John A. Kolbe
By Ferd Bing
Attorney Patented Dec. 8, 1953

2,661,968

UNITED STATES PATENT OFFICE 2,661,968

ATTACHMENT OF DECORATIVE BALLS BETWEEN PARALLEL TUBE ELEMENTS OF FURNITURE

John A. Kolbe, North Manchester, Ind., assignor to Arnolt Corporation, Warsaw, Ind., a corporation of Indiana Application August 10, 1949, Serial No. 109,568

4 Claims. (Cl. 287—54)

This invention relates to tubular metal furniture and particularly to such furniture wherein spaced parallel tubular frame elements have decorative metal balls disposed therebetween.

In tubular metal furniture such as tables or table aprons where parallel tubular elements are spaced apart by decorative metal balls, the fastening of such balls to the tubular elements has been attained either by welding, or by elongated bolts and nuts, or screws passing through the decorative ball, through both walls of one tube and through at least one wall and sometimes both walls of the other tube. Both prior methods of connection of such parts have been found to be objectionable, the bolt and nut or screw method leaving one or two screw heads or nuts in objectionably exposed positions on the sides of the tubular elements so as to detract from the appearance, while the welded construction in most instances requires complete assembly at the factory so that the economies of unassembled, or knocked down, packing and shipping cannot be obtained.

In view of the foregoing it is the primary object of the present invention to afford a simplified and improved method or arrangement for fastening such tubular elements and intermediate decorative balls together whereby to attain the neat appearance heretofore attained in welded constructions while at the same time enabling the parts to be shipped in a knocked down or unassembled form with the resultant advantages that attend such shipment. More specifically it is an object of this invention to enable fastening elements to be extended from the inside of the hollow decorative balls and into the adjacent sides of the respective tubular elements, and a related object is to enable this to be done in a simple manner and without the use of jigs, fixtures and the like so as to thereby enable the fastening operations to be performed in an ordinary retail furniture store.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawing:

Fig. 1 is a perspective view of a table wherein the tubular leg and apron elements are connected together in spaced relation by decorative balls attached in accordance with the present invention;

Fig. 2 is a fragmentary elevational view showing two of the tubular elements and a decorative ball connected therebetween in accordance with the invention;

Fig. 3 is a perspective view showing a decorative ball formed in accordance with the present invention;

Fig. 4 is a perspective view showing the way in which the fastening screws are tightened; and Fig. 5 is a somewhat diagrammatic view showing the way in which the decorative balls are rotated to the most advantageous position after the fastening operation has been completed.

For purposes of disclosure the invention is herein illustrated as embodied in a table 10 having a table top T with a depending apron A and supporting legs L which are formed from parallel tubular elements connected together and held in spaced relation by means including decorative balls B. Thus in the table 10 the apron A is formed in part by a pair of upper tubular elements 12 that are shaped in plan form so that when the two elements 12 are placed with their opposite ends in opposed relation, they serve to afford a complete upper apron structure that conforms with the outline or plan form of the top T and these upper tubular elements 12 are permanently connected to the lower face of the table top T by any conventional means. In the table 10 the apron A also includes lower tubular elements which in the present instance are formed as continuous or integral extensions of the tubular elements of the several legs L. Thus each leg L comprises a pair of tubular members 14 and 15 arranged throughout a substantial distance in parallel spaced relation and diverging at their upper ends to afford horizontal lower apron elements 14A and 15A that extend parallel to substantial portions of the upper apron elements 12. In the present instance each leg element 14 is individually formed, while the leg elements 15 and their integral apron elements 15A at each end of the table are formed from a single piece of tubing.

The decorative balls B are made from sheet metal and are given the desired generally spherical shape by processes of drawing and forming which normally leave a circular side opening 18 therein, as best illustrated in Fig. 3, and in accordance with the present invention, such balls are subjected to a further operation in which diametrically opposite extension slots 20 are formed from the opposite sides of the side opening 18. These slots 20 have curved or arcuate ends 20C, Fig. 3, and the slots extend to such positions that the centers of these arcuate ends are located substantially on a diameter of the ball B.

With the balls B thus formed with slots 20 extended from the openings 18 thereof, it has been found that screws 22 may be extended through the slots 20 and into the adjacent side walls of the tubular elements such as the legs 14 and 15, thereby to enable the heads 22H of the screws to securely clamp the balls B to the legs or the like, and this may be accomplished in a simple manner through the use of a screw-driver S, as shown in Fig. 4.

Thus the various tubular elements 12, 14, and 15 are formed with punched starting holes at those locations where balls B are to be attached, and the screws 22 are of the self-tapping type and are partially screwed into such pre-punched holes so as to leave the heads 22H spaced substantially from the sides of the tubular elements. A ball B may then be put in position between two such tubular elements by working the slots 20 into position about the two screws 22 that project from the adjacent sides of the two tubular elements, and the heads 22H are then located within the ball B. In such operation the opening 18 is located in a plane parallel to the axes of the two tubular elements, and when this is done, the screw driver S may be extended into the interior of the ball B and into engagement with the slot of one of the screw heads 22H, thereby to enable the screw to be tightened. In this respect it will be observed that the shank of the screw driver S extends through the open end of the slot 20 on the opposite side of the ball B, thereby to minimize the angle between the axis of the screw 22 and the shank of the screw driver S. It will be understood of course that if desired both screws 22 may be tightened after the ball B has been put into the relation of Fig. 4, or if desired, the ball B may be put in position on one tubular element and the screw in such element may be tightened before the ball B is put into the relation of Fig. 4 with respect to the other tubular element. This latter procedure would of course be followed in respect to the tubular elements 14A and 12, and 15A and 12, and in such instances the screws in the elements 14A and 15A would first be tightened, and thereafter the balls B would be put in the desired relation to the screws in the element 12, and such screws would then be tightened.

After the two screws 22 have been tightened, the ball B may be rotated about the axis of the screws 22 so as to dispose the opening 18 in the most inconspicuous location, and to do this a tool such as a rod 26 is inserted into the opening 18, as shown in Fig. 5, and the desired rotative motion is applied to the ball.

From the foregoing description it will be apparent that the present invention materially simplified the manufacture and distribution of tubular metal furniture wherein decorative metal balls are connected between parallel tubular elements, and it will be evident also that under this invention such furniture may be shipped in knocked down relationship and may be readily assembled without leaving exposed screw heads or nuts as has been necessary with prior constructions that could be thus packed and shipped.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In an article of furniture, a pair of tubular elements disposed in spaced parallel relation, a hollow decorative metal ball having a circular side opening with extension slots extended from diametrically opposite sides of the opening, said ball being disposed between said tubular elements with the end portions of said slots located in opposed relation to the respective adjacent sides of said elements, and headed screws extended from the inside of said ball through the respective slots and threaded into said tubular elements to engage the heads of the screws tightly with the internal surfaces of the ball and thereby secure the elements to said ball.

2. In an article of furniture, a pair of tubular elements disposed in spaced parallel relation, a hollow decorative metal ball having a side opening with extension slots extended from diametrically opposite sides of the opening, said slots terminating in arcuate ends the axes of the arcuate edges of which are disposed substantially on a diameter of said ball, said ball being disposed between said tubular elements with said arcuate ends of said slots located in opposed relation to the respective adjacent sides of said elements, and headed screws extended through the respective slots and threaded into said tubular elements to engage the heads of the screws tightly with the internal surfaces of the ball and thereby secure the elements to said ball.

3. In an article of furniture, a tubular element, a hollow decorative metal ball having a side opening with extension slots extended from diametrically opposite sides of the opening, said ball being disposed with the end portion of one of said slots located in opposed relation to an adjacent side of said element, and a headed screw extended from within said ball through said slot and threaded into said tubular element to engage the head of the screw tightly with the internal surface of the ball and thereby secure the element to said ball.

4. In an article of furniture, a pair of tubular metal members disposed in spaced parallel relation, spaced openings in the tubular members in opposed relationship, headed screws adapted to be partially threaded into the spaced openings, a hollow decorative metal ball having a side opening with extension slots extending from diametrically opposite sides of the opening, the slots terminating in arcuate ends the axes of which are disposed substantially on the axis of the ball, the ball being disposed between the parallel tubular members with the arcuate ends of the slots located in opposed relation to the respective adjacent sides of the members, the slots and arcuate ends so disposed as to partially surround the headed screws with the head adjacent the inner side of the ball, the screws being fully threaded into the spaced openings thereby securing the ball to the adjacent parallel members.

JOHN A. KOLBE.

References Cited in the file of this patent

UNITED STATES PATENTS

| Number | Name | Date |
|---|---|---|
| D. 151,780 | Low | Nov. 16, 1948 |
| 344,675 | Ordway | June 29, 1886 |
| 1,265,778 | Hartline | May 14, 1918 |
| 1,423,280 | Urich | July 18, 1922 |
| 1,521,619 | Haas | Jan. 6, 1925 |
| 1,551,625 | Schwartz | Sept. 1, 1925 |
| 1,740,992 | McCretton | Dec. 24, 1929 |
| 2,384,968 | Schwinn | Sept. 18, 1945 |
| 2,563,976 | Torosian | Aug. 14, 1951 |